(12) United States Patent
Liang

(10) Patent No.: US 8,056,848 B1
(45) Date of Patent: Nov. 15, 2011

(54) BLADE ASSEMBLY OF A BLENDER

(76) Inventor: Kai-Fu Liang, Tucheng (TW)

( * ) Notice: Subject to any disclaimer, the term of this patent is extended or adjusted under 35 U.S.C. 154(b) by 0 days.

(21) Appl. No.: 12/843,890

(22) Filed: Jul. 27, 2010

(51) Int. Cl.
*A47J 43/046* (2006.01)

(52) U.S. Cl. .................. 241/292.1; 241/282.2; 366/205; 366/314

(58) Field of Classification Search .............. 241/292.1, 241/282.1, 282.2; 366/205, 314
See application file for complete search history.

(56) References Cited

U.S. PATENT DOCUMENTS 6,834,818 B2 * 12/2004 Lee ............................ 241/292.1

* cited by examiner

*Primary Examiner* — Mark Rosenbaum

(57) ABSTRACT

A blade assembly of a blender consists of a first and a second blade. The first blade has an elongated and slightly elevated body with two vertical tips, and the second blade with the body bent downwardly. The unique design of said first and second blades can create a turbulent flow, allowing the content in the container cycling between the blades to achieve finer particle and efficient processing time.

6 Claims, 6 Drawing Sheets

BLADE ASSEMBLY OF A BLENDER

FIELD OF THE INVENTION

The present invention relates to a blade assembly of a blender

DESCRIPTION OF PRIOR ART

Conventional blenders usually comprise two layers of blades attached to the rotor to form a cross and provided on the bottom of the blending container. The plain cross shape of the blade assembly limits the stirring range and cutting ability. Therefore, modification has been made by bending the tips of the first-layer blade upwardly and the tips of the second-layer blade downwardly to improve both stirring range and cutting ability of the blender.

However, during the mixing or crushing process, the plain design of said improved tip-bending blade makes the first-layer blade cutting the content mostly and only a fewer portion is processed by the second-layer blade, lowering the efficiency of the blender. Thus, to increase the efficiency of the blender and to shorten the processing time has become the main objective of the present invention.

Further, when processing hard object, such as crushing ice, the friction with the blades increases the power consumption of the blender. Therefore, to reduce the friction with the blades without affecting its processing ability has become another objective of the present invention.

SUMMARY OF THE INVENTION

To solve foregoing disadvantages, a blade assembly of a blender consists essentially of a first and a second blade (3, 4), having an square axial hole (38, 47) provided on each thereof, a screw (6) which can pass said axial holes (38, 47) and engages with a receiving hole (11) on a drive shaft (1), a seat (2) corresponds with said drive shaft (1), and a gear (5) provided on a bottom of the seat (2). Said first blade (3) comprising a cutting edge (31) on a side and a spine (32) on an another side and said second blade (4) comprising a cutting edge (41) on a side and a spine (42) on an another side, characterized in that:

Said first blade (3) comprises of a flat portion (33) having said axial hole (38) in an center, a wing portion (34) extended respectively from a left and right side of said flat portion (33) and a tip portion (35) extended upwardly from a distal end of each wing portion (34); each wing portion (34) is inclined upwardly by an upward first angle (θ1), each tip portion (35) is set perpendicular with axis Y by a second angle (θ2) and an edge (30) of said flat portion (33) where connecting to said wing portion (34) is inclined by a third angle (θ3). Said wing portion (34) is also lifted by a lifting forth angle (θ4) and said tip portion (35) is inclined backwardly by a fifth angle (θ5).

Said second blade (4) comprising of a flat portion (43) having said axial hole (47) in an center and a wing portion (44) extended respectively from a left and right side of said flat portion (43); each wing portion (44) is inclined downwardly by an downward sixth angle (θ6) and an edge (40) of said flat portion (43) where connecting to said wing portion (44) is inclined by a seventh angle (θ7).

By elevating the wing portion (34) with the first angle (θ1) and the cutting edge with the fourth angle (θ4), the angled wing portion (34) of the first blade (3) can lead the content crushed by the first blade (3) passing downwardly and be processed by the second blade (4), increasing the efficiency and shortening the processing time. The vertical cutting tip (35) can bring the content precipitated in the bottom of the container toward the upper portion and also stabilize the blade.

The bending second blade (4) can create a turbulent flow, allowing the content cycling between both first and second blade (3, 4), blending to finer particles. The waving-designed cutting edges (31, 41) of the first and second blades (3, 4) can cut the fiber of the food or fruit with efficiency.

DETAILED DESCRIPTION OF PREFERRED EMBODIMENTS

The preferred embodiments of the present invention are described in detail according to appended drawings.

Figure 1:
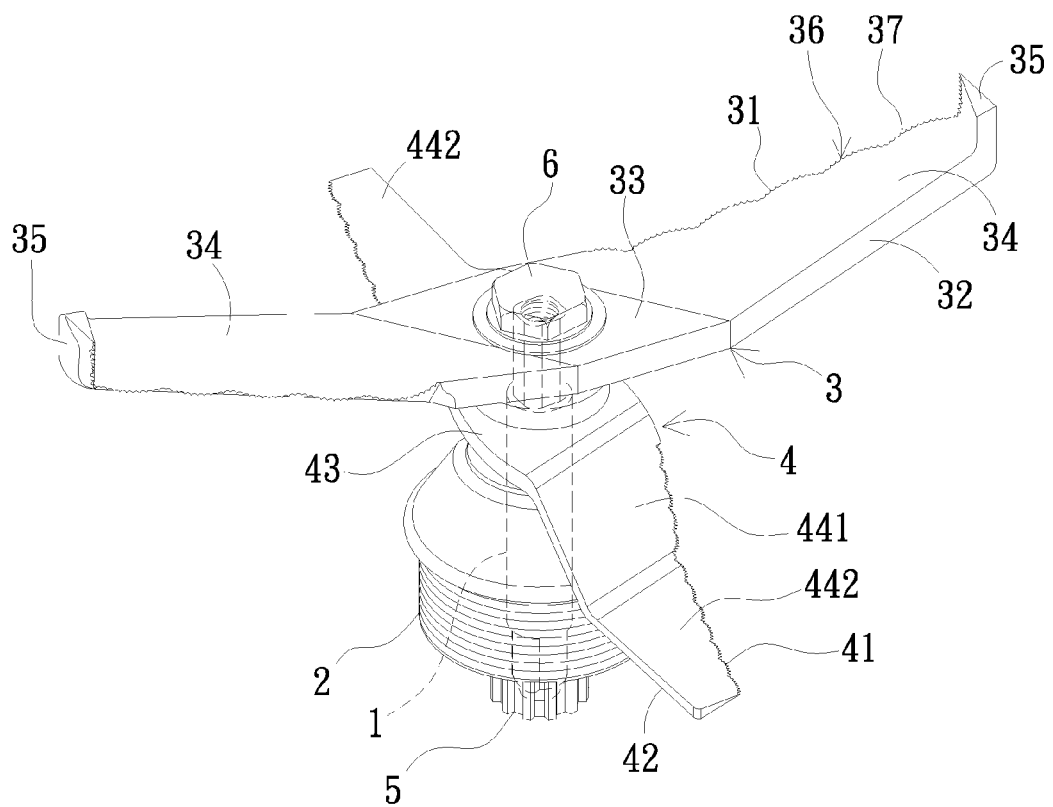
FIG. 1 is a perspective view of the blade assembly according to the invention.
Figure 2:
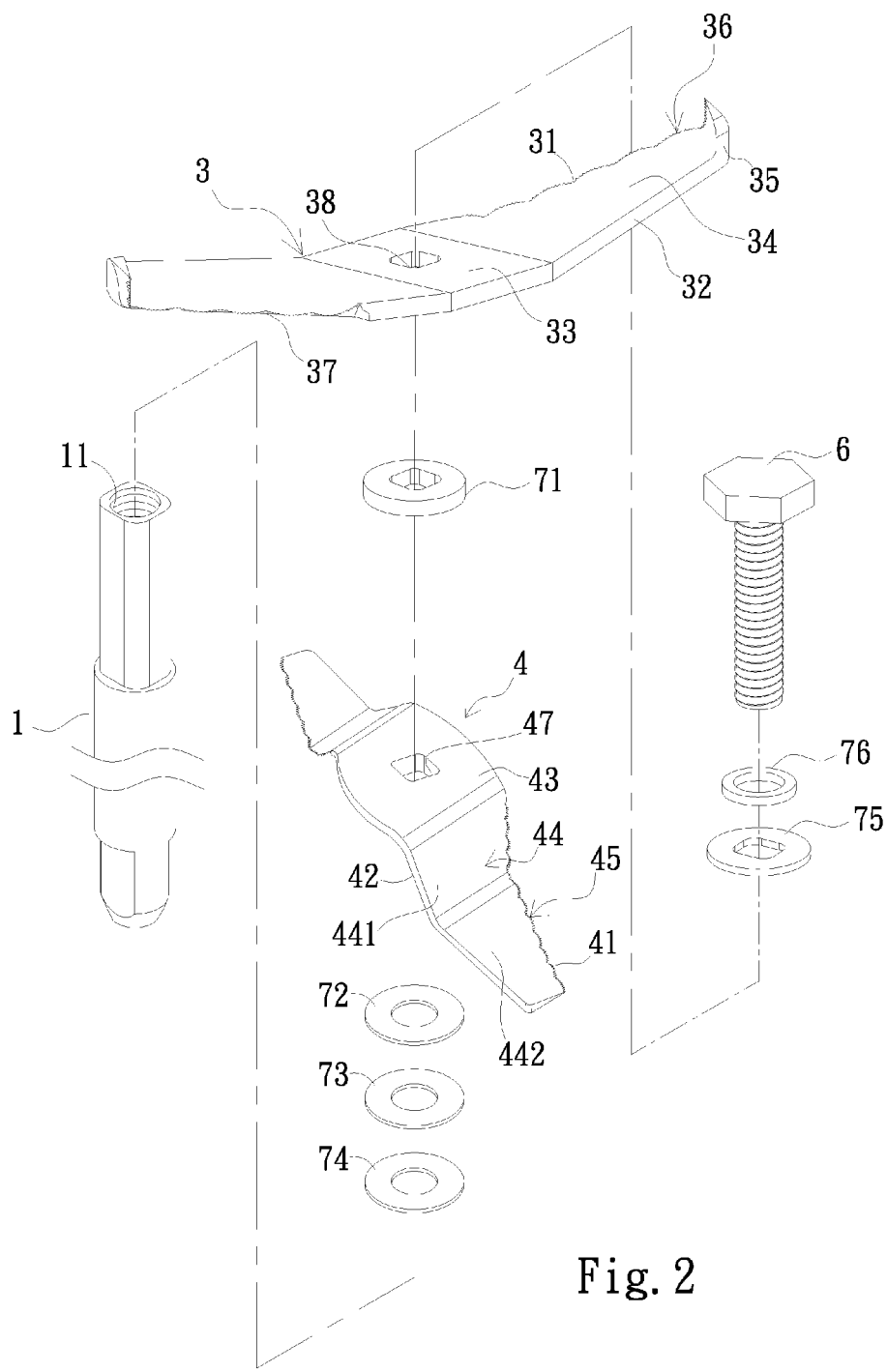
FIG. 2 is an exploded view of the blade assembly.
Figure 3:
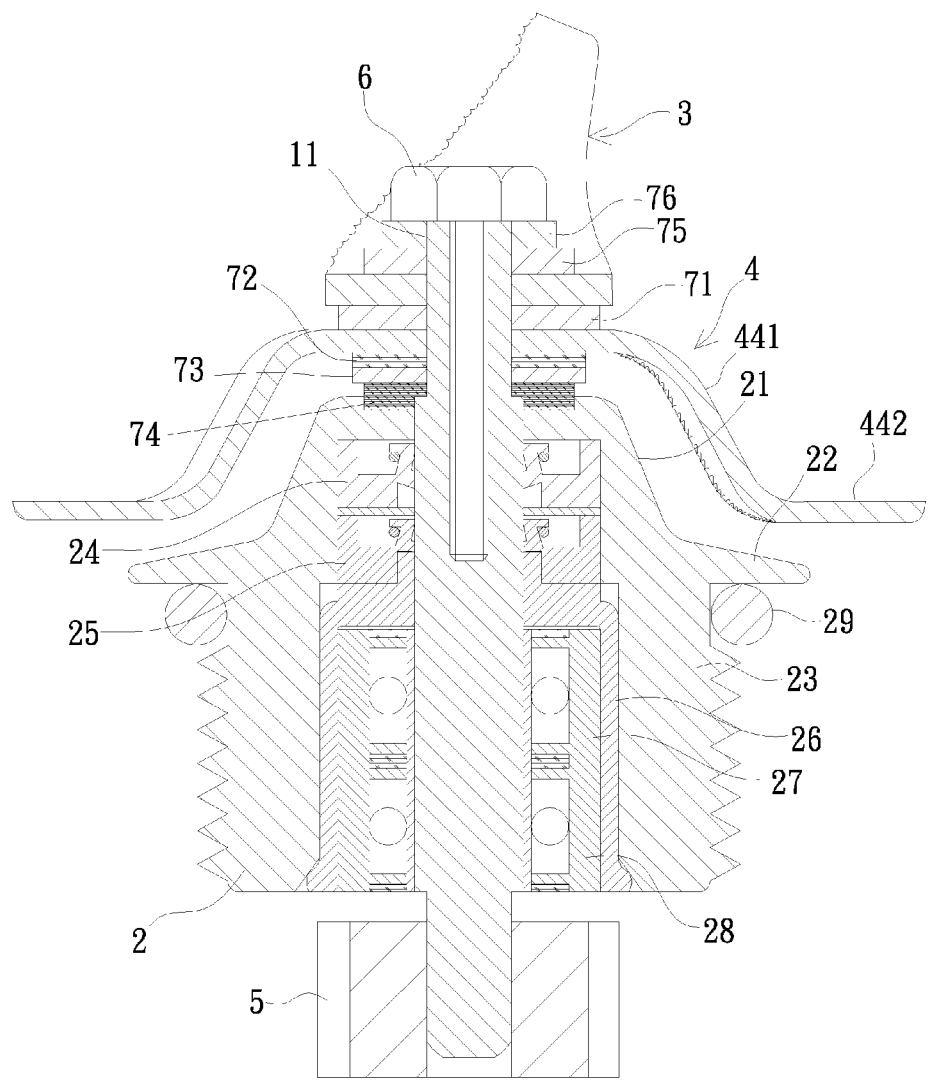
FIG. 3 is a cross sectional view of the blade assembly.

Referring to FIGS. 1-3, a blade assembly of a blender consists of a first and a second blade (3, 4) spaced by a gasket (71) and other three gaskets (72, 73, 74) are provided on the bottom of the second blade (4). Said first and second blades (3, 4) have a square axial hole (38, 47) provided on each thereof, and a screw (6) which can pass said axial holes (38, 47), gaskets (72, 73, 74) and screwed into a receiving hole (11) of a drive shaft (1) for fastening the blades (3, 4). A seat (2) which corresponds with said drive shaft (1) is provided under, and a gear (5) is provided on the bottom of the seat (2). To ensure both blades can be fixed tightly, two gaskets (75, 76) are provided further between the screw (6) and the first blade (3).

Figure 4:
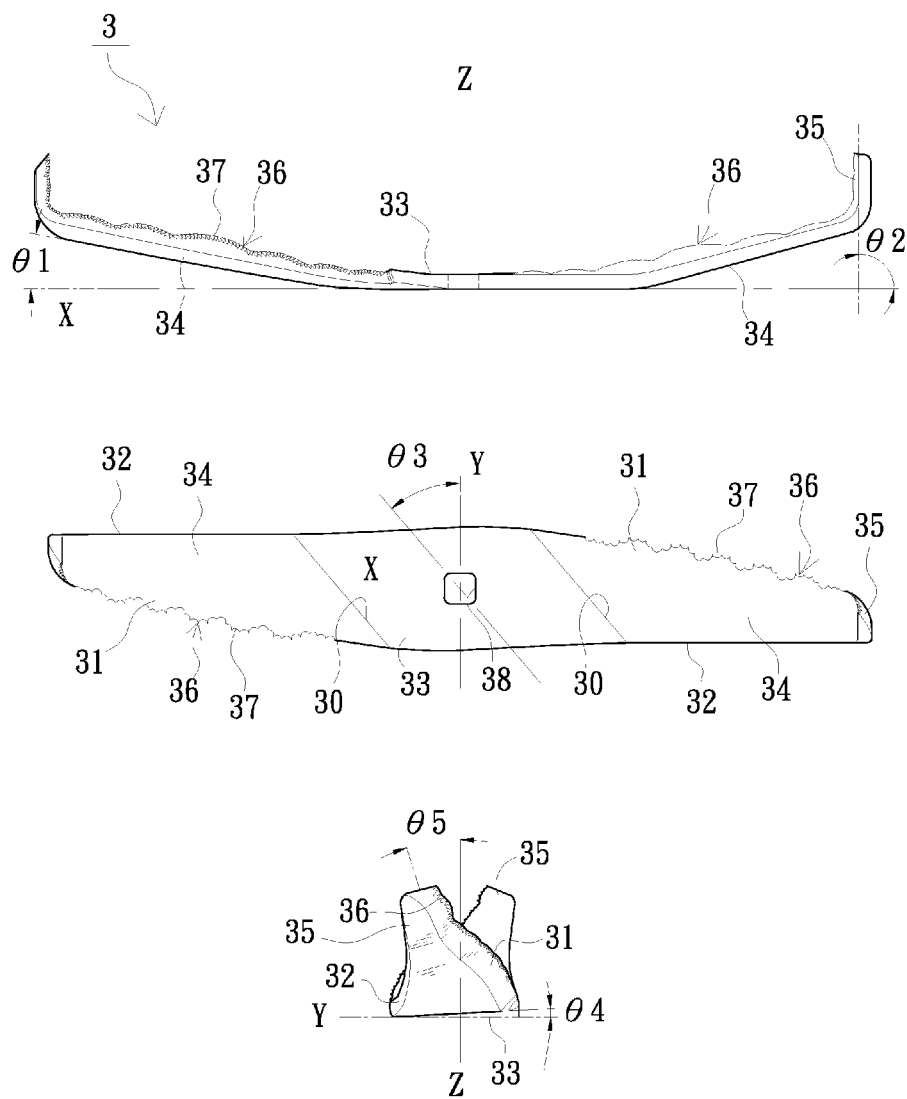
FIG. 4 illustrates a front, a top and a side view of the first blade of the invention.

Said first blade (3) comprises a cutting edge (31) on a side and a spine (32) on another side. Referring to FIG. 4, said first blade (3) includes further a flat portion (33) with the axial hole (38) in the center, a wing portion (34) extended respectively from the left and right side of said flat portion (33) and a tip portion (35) extended upwardly from a distal end of each wing portion (34). Each wing portion (34) is elevated from the horizontal X-axis by an upward first angle (θ1), each tip portion (35) is set perpendicular with the X-axis by a second angle (θ2) and an edge (30) of said flat portion (33) where connecting to said wing portion (34) is inclined by a third angle (θ3) relative to the horizontal Y-axis. Said wing portion (34) is also elevated from the Y-axis by a forth angle (θ4) and said vertical tip portion (35) is inclined backwardly by a fifth angle (θ5).

When the first blade (3) rotates, said elevated wing portion (34) generates a turbulent flow on the upper side and a down force on the bottom, leading the content that crushed by the first blade (3) can pass downwardly and be processed by the second blade (4), increasing the efficiency and shortening the processing time. The vertical cutting tip (35) can bring the content precipitated in the bottom of the container toward the upper portion and also stabilize the blade.

Said first angle (θ1) is set in a range of 15° to 25° degrees, said second angle (θ2) is set to have 90° degrees, said third degree (θ3) is set in a range of 40° to 50° degrees, said forth angle (θ4) is set in a range of 5° to 15° degrees, said fifth angle ($\theta 5$) is set in a range of 25° to 35° degrees, said sixth angle ($\theta 6$) is set in a range of 10° to 20° degrees and said seventh angle ($\theta 7$) is set in a range of 15° to 25° degrees.

Said cutting edge (31) and tip portion (35) of the first blade (3) are provided with a plurality of waving shapes (36), and each waving shape (36) comprising pluralities of teeth (37).

Figure 5:
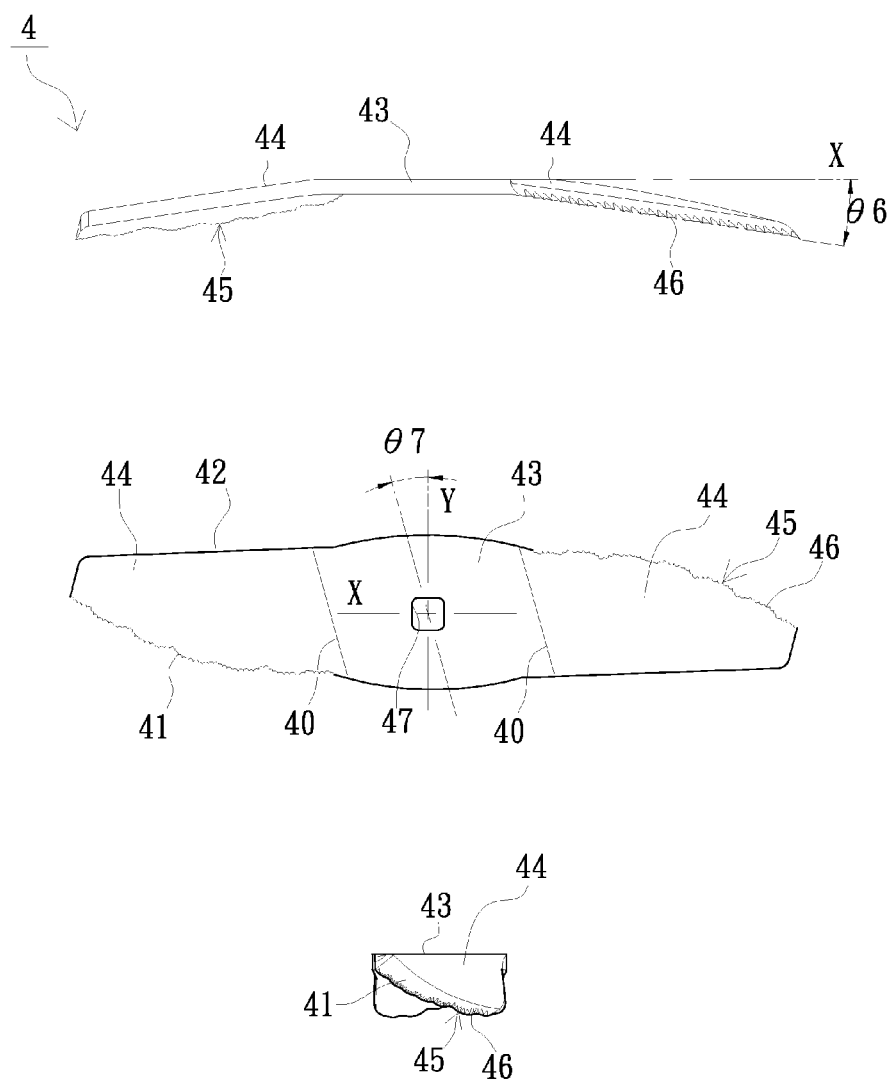
FIG. 5 illustrates a front, a top and a side view of the second blade of the invention.

Said second blade (4), as shown in FIG. 5, comprises a cutting edge (41) on a side and a spine (42) on another side. Said second blade (4) further includes a flat portion (43) having said axial hole (47) in the center and a wing portion (44) extended respectively from a left and right side of said flat portion (43). Each wing portion (44) is set downwardly from the horizontal X-axis by a sixth angle ($\theta 6$) and an edge (40) of said flat portion (43) where connecting to said wing portion (44) is inclined from the horizontal Y axis by a seventh angle ($\theta 7$).

Said sixth angle ($\theta 6$) is set in a range of 10° to 20° degrees and said seventh angle ($\theta 7$) is set in a range of 15° to 25° degrees.

Figure 6:
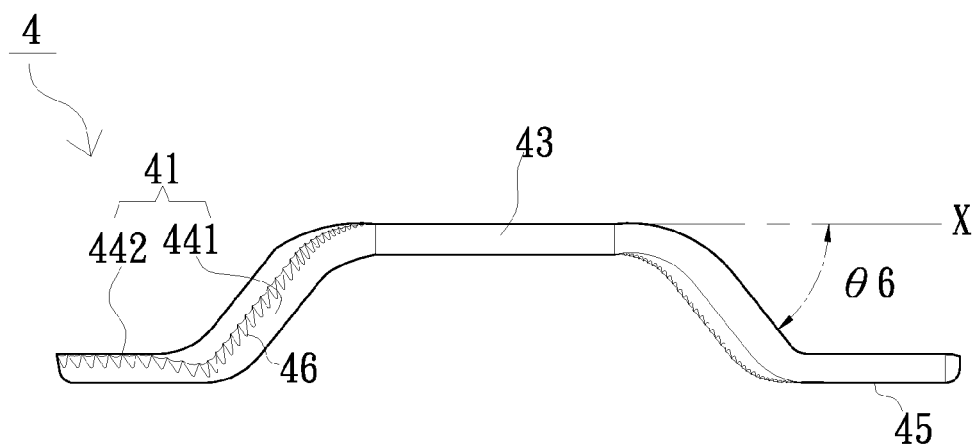
FIG. 6 illustrates a front, a top and a side view of another embodiment of the second blade of the invention.
Figure 6:
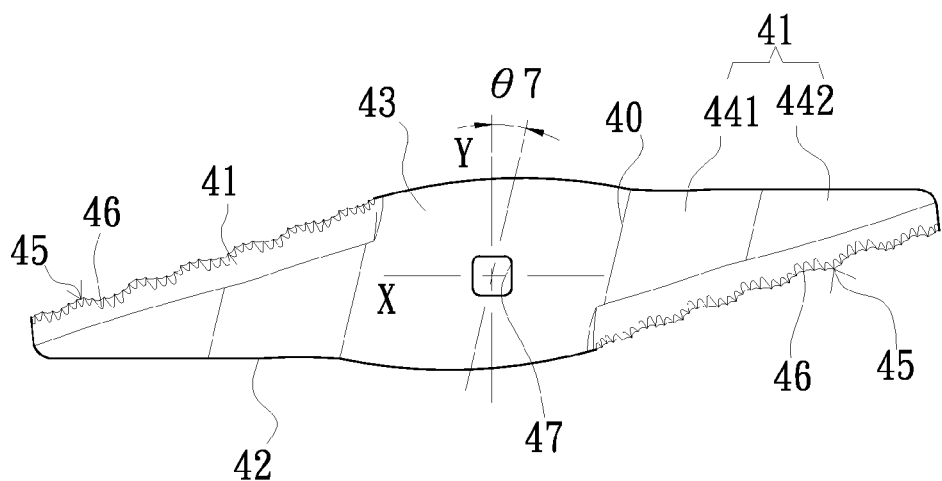
Figure 6:
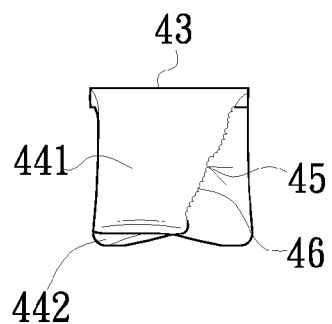

Another embodiment of said second blade (4) is disclosed according to FIG. 6, wherein said wing portion (44) of the second blade (4) includes an upper and a lower portion (441, 442). The upper portion (441) is extended respectively from a left and right side of said flat portion (43) and each upper portion (441) is set downwardly from the horizontal X-axis by a sixth angle ($\theta 6$) and an edge (40) of said flat portion (43) where connecting to said upper portion (441) of the wing portion (44) is inclined by a seventh angle ($\theta 7$).

Said sixth angle ($\theta 6$) is set in a range of 40° to 50° degrees and said seventh angle ($\theta 7$) is set in a range of 15° to 25° degrees.

Said cutting edge (41) and tip portion (45) of the second blade (4) are provided with a plurality of waving shapes (46), and each waving shape (46) comprising pluralities of teeth (47)

The bending second blade (4) creates a turbulent flow, allowing the content that need to be processed cycling between both first and second blades (3, 4), blending into finer particles. The waving-designed cutting edges (31, 41) of the first and second blades (3, 4) can cut the fiber of the food or fruit finely with efficiency.

The structure of said seat (2) is shown in FIG. 3. Said seat (2) consists of a conical portion (21) provided on a top end thereof, a threaded connecting portion (23) provided on a bottom end and a flange (22) provided in between for holding an O-ring (29). Said seat (2) incorporates two ring seals (24, 25) to avoid of the liquid penetrating therein, two bearings (27, 28) and a bearing cap (26) sheathing thereon.

The invention claimed is:

1. A blade assembly of a blender consists essentially of
a first and a second blade (3, 4), having an square axial hole (38, 47) provided on each thereof;
a screw (6) which passes said axial holes (38, 47) and engages with a receiving hole (11) on a drive shaft (1);
a seat (2) corresponds with said drive shaft (1); and
a gear (5) provided on a bottom of the seat (2); said first blade (3) comprising a cutting edge (31) on a side and a spine (32) on an another side and said second blade (4) comprising a cutting edge (41) on a side and a spine (42) on an another side;

characterized in that:
said first blade (3) comprising a flat portion (33) having said axial hole (38) in a center, a wing portion (34) extended respectively from a left and right side of said flat portion (33) and a tip portion (35) extended upwardly from a distal end of each wing portion (34); each wing portion (34) is elevated by an upward first angle ($\theta 1$), each tip portion (35) is set perpendicular with a horizontal X-axis by a second angle ($\theta 2$) and an edge (30) of said flat portion (33) where connecting to said wing portion (34) is inclined by a third angle ($\theta 3$); said wing portion (34) is also lifted by a lifting fourth angle ($\theta 4$) and said tip portion (35) is inclined backwardly by a fifth angle ($\theta 5$);
said second blade (4) comprising of a flat portion (43) having said axial hole (47) in a center and a wing portion (44) extended respectively from a left and right side of said flat portion (43); each wing portion (44) is inclined downwardly by a downward sixth angle ($\theta 6$) and an edge (40) of said flat portion (43) where connecting to said wing portion (44) is inclined by a seventh angle ($\theta 7$).

2. The blade assembly of a blender of claim 1, wherein said first angle ($\theta 1$) is set approximately between 15° and 25° degrees, said second angle ($\theta 2$) is set to have 90° degrees, said third degree (83) is set approximately between 40° and 50° degrees, said fourth angle ($\theta 4$) is set approximately between 5° and 15° degrees, said fifth angle ($\theta 5$) is set approximately between 25° and 35° degrees, said sixth angle ($\theta 6$) is set approximately between 10° and 20° degrees and said seventh angle ($\theta 7$) is set approximately between 15° and 25° degrees.

3. The blade assembly of a blender of claim 1, wherein said cutting edge (31) and tip portion (35) of the first blade (3) are provided with a plurality of waving shapes (36), each waving shape (36) comprising pluralities of teeth (37); said cutting edge (41) and tip portion (45) of the second blade (4) are provided with a plurality of waving shapes (46), and each waving shape (46) comprising pluralities of teeth (47).

4. The blade assembly of a blender of claim 1, wherein said wing portion (44) of the second blade (4) comprising an upper and a lower portion (441, 442); said upper portion (441) extended respectively from a left and right side of said flat portion (43) and each upper portion (441) is inclined downwardly by an downward sixth angle ($\theta 6$) and an edge (40) of said flat portion (43) where connecting to said upper portion (441) of the wing portion (44) is inclined by a seventh angle ($\theta 7$).

5. The blade assembly of a blender of claim 4, wherein said sixth angle ($\theta 6$) is set approximately between 40° and 50° degrees and said seventh angle (87) is set approximately between 15° and 25° degrees.

6. The blade assembly of a blender of claim 1, wherein the seat (2) comprising a conical portion (21) provided on a top end thereof, a threaded connecting portion (23) provided on a bottom end and a flange (22) provided in between for holding an O-ring (29).

* * * * *